US012769602B2

(12) United States Patent
Routray et al.

(10) Patent No.: US 12,769,602 B2
(45) Date of Patent: Oct. 20, 2026

(54) CENTRALIZED SYSTEM LOG PROCESSING TO MINIMIZE IMPACT OF ISSUES ON PRODUCTION USE OF SOFTWARE SYSTEMS

(71) Applicant: SAP SE, Walldorf (DE)

(72) Inventors: Pankaj Kumar Routray, Banglore (IN); Arindam Bhattacharyya, Bangalore (IN); Bala Murali Krishna Athava, Bangalore (IN); Erik Oster, Heidelberg (DE)

(73) Assignee: SAP SE, Walldorf (DE)

(*) Notice: Subject to any disclaimer, the term of this patent is extended or adjusted under 35 U.S.C. 154(b) by 0 days.

(21) Appl. No.: 18/951,745

(22) Filed: Nov. 19, 2024

(65) Prior Publication Data

US 2026/0079780 A1 Mar. 19, 2026

(30) Foreign Application Priority Data

Sep. 19, 2024 (IN) ............................ 202411070956

(51) Int. Cl.
*G06F 11/07* (2006.01)
*G06F 11/362* (2025.01)

(52) U.S. Cl.
CPC ...... *G06F 11/0787* (2013.01); *G06F 11/0778* (2013.01); *G06F 11/0784* (2013.01); *G06F 11/366* (2013.01)

(58) Field of Classification Search
CPC ............ G06F 11/0778; G06F 11/0784; G06F 11/0787; G06F 11/3604; G06F 11/3612; G06F 11/362; G06F 11/366
See application file for complete search history.

(56) References Cited

U.S. PATENT DOCUMENTS

| | | | | |
|---|---|---|---|---|
| 10,956,299 | B2 * | 3/2021 | Krishnan | G06F 11/0709 |
| 2006/0184829 | A1 * | 8/2006 | Cheong | G06F 11/3604 714/39 |
| 2016/0173486 | A1 * | 6/2016 | Abbott | H04L 67/02 713/175 |
| 2016/0224405 | A1 * | 8/2016 | Bohn | G06F 11/0793 |
| 2018/0108022 | A1 * | 4/2018 | Bandera | G06Q 10/06316 |
| 2020/0036581 | A1 * | 1/2020 | Pannem | H04L 41/5074 |
| 2021/0303440 | A1 * | 9/2021 | Rodgers | G06F 11/3065 |
| 2022/0019496 | A1 * | 1/2022 | Lozano | G06F 11/0778 |
| 2022/0129287 | A1 * | 4/2022 | Permenter | G06F 9/452 |

* cited by examiner

*Primary Examiner* — Marc Duncan
*Assistant Examiner* — Albert Li
(74) *Attorney, Agent, or Firm* — Fish & Richardson P.C.

(57) ABSTRACT

Methods, systems, and computer-readable storage media for receiving, by a management tool of a software vendor, a payload including system data that is representative of a software system experiencing an issue, generating, by the management tool, a service using the system data provided in the payload, executing the service to trigger an automated procedure that collects one or more log files from one or more source systems, uploads the one or more log files to a repository, and provides a uniform resource locator (URL) that provides a link to the one or more log files within the repository, and transmitting a response to a ticketing system, the response including the URL.

20 Claims, 5 Drawing Sheets

CENTRALIZED SYSTEM LOG PROCESSING TO MINIMIZE IMPACT OF ISSUES ON PRODUCTION USE OF SOFTWARE SYSTEMS

CROSS-REFERENCE TO RELATED APPLICATIONS

This application claims priority to and the benefit of Indian App. No. 202411070956, filed on Sep. 19, 2024, and entitled Centralized System Log Processing to Minimize Impact of Issues on Production Use of Software Systems, the disclosure of which is expressly incorporated herein by reference in the entirety.

BACKGROUND

Enterprises use software systems to conduct operations. Example software systems can include, without limitation, enterprise resource management (ERP) systems, customer relationship management (CRM) systems, human capital management (HCM) systems, and the like. Software systems (e.g., ERP, CRM, HCM) maintain respective sets of system logs that record interactions within the respective software systems. In some examples, a software vendor can provision software systems to enterprises, which can be referred to customers in this context.

Issue-free operation of software systems can be critical for customers. For example, some issues (e.g., errors) arising in software systems can result in operations being offline for a period of time. Consequently, issues arising in software systems are expected to be resolved by software vendors as soon as practical to mitigate any disruption to production use of the software systems. This urgency is particularly enhanced in situations where the software systems are hosted in vendor-provided cloud platforms. When an issue does arise, customers can request resolution through a ticketing system, in which a ticket is raised with the vendor that provides information representative of the customer, the software system, and the issue, among other information.

SUMMARY

Implementations of the present disclosure are directed to processing of system logs for resolution of issues related to software systems. More particularly, implementations of the present disclosure are directed to a system log management system for centralized processing of system logs to improve time- and resource-efficiency in issue resolution.

In some implementations, actions include receiving, by a management tool of a software vendor, a payload including system data that is representative of a software system experiencing an issue, generating, by the management tool, a service using the system data provided in the payload, executing the service to trigger an automated procedure that collects one or more log files from one or more source systems, uploads the one or more log files to a repository, and provides a uniform resource locator (URL) that provides a link to the one or more log files within the repository, and transmitting a response to a ticketing system, the response including the URL. Other implementations of this aspect include corresponding systems, apparatus, and computer programs, configured to perform the actions of the methods, encoded on computer storage devices.

These and other implementations can each optionally include one or more of the following features: the service is generated using a service definition that defines configuration data for the service; a cloud platform integration (CPI) component provides a communication channel between the ticketing system and the management tool, the ticketing system being provisioned by a third-party provider; the system data includes a first sub-set of data that is automatically populated in a form and a second sub-set of data that is input by a user that submits the form, the payload being generated using the form; the ticketing system updates the ticket to indicate that the one or more log files have been collected and to add the URL to the ticket; the one or more log files are identified for collection at least partially based on a system identifier and a type of system log provided in the system data; and the response further includes a service execution identifier that uniquely identifies execution of the service.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
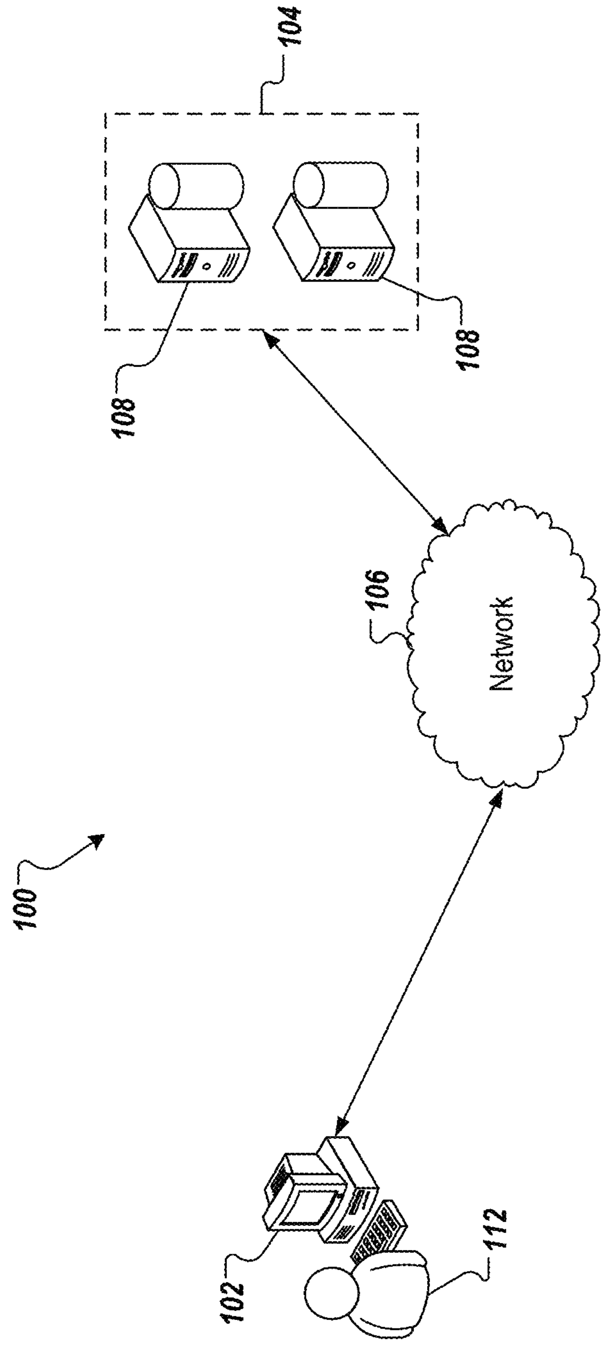
FIG. 1 depicts an example architecture that can be used to execute implementations of the present disclosure.

Implementations of the present disclosure are directed to processing of system logs for resolution of issues related to software systems. More particularly, implementations of the present disclosure are directed to a system log management system for centralized processing of system logs to improve time- and resource-efficiency in issue resolution. Implementations can include actions of receiving, by a management tool of a software vendor, a payload including system data that is representative of a software system experiencing an issue, generating, by the management tool, a service using the system data provided in the payload, executing the service to trigger an automated procedure that collects one or more log files from one or more source systems, uploads the one or more log files to a repository, and provides a uniform resource locator (URL) that provides a link to the one or more log files within the repository, and transmitting a response to a ticketing system, the response including the URL.

Implementations of the present disclosure are described in further detail herein with reference to example systems, components, platforms, and the like (collectively, "offerings") provided by SAP SE of Walldorf, Germany. It is contemplated, however, that implementations of the present disclosure can be realized with any appropriate offering provided by any provider.

To provide further context for implementations of the present disclosure, and as introduced above, enterprises use software systems to conduct operations. Example software systems can include, without limitation, enterprise resource management (ERP) systems, customer relationship management (CRM) systems, human capital management (HCM) systems, and the like. Software systems (e.g., ERP, CRM, HCM) maintain respective sets of system logs that record interactions within the respective software systems. In some examples, a software vendor can provision software systems to enterprises, which can be referred to customers in this context.

Issue-free operation of software systems can be critical for customers. For example, some issues (e.g., errors) arising in software systems can result in operations being offline for a period of time. Consequently, issues arising in software systems are expected to be resolved by software vendors as soon as practical to mitigate any disruption to production use of the software systems. This urgency is particularly enhanced in situations where the software systems are hosted in vendor-provided cloud platforms. When an issue does arise, customers can request resolution through a ticketing system, in which a ticket is raised with the vendor that provides information representative of the customer, the software system, and the issue, among other information.

In some scenarios, a service management tool is provided that enables customer tickets to be resolved. An example service management tool includes Service Provider Cockpit (SPC), provided by SAP SE, which can be described as a tool that can be used to perform, among other activities, service management activities (e.g., tickets, change requests (CRs)). For example, engineers (e.g., assigned to an Enterprise Cloud services (ECS) unit) can use SPC to handle customer tickets. In some instances, issues represented in tickets cannot be addressed by the engineers and can be forwarded to a specialized unit within the vendor for handling (e.g., to SAP Technical Assistant within SAP SE). In some examples, the specialized unit uses a different tool to manage tickets. An example tool includes ServiceNow, which can be described as a cloud-based platform for automating enterprise workflows.

In resolving tickets, availability of the system logs is the most important factor in time- and resource-efficient resolution of tickets to enable enterprises to return to error-free operation. Traditional approaches, however, implement a time- and resource-intensive, manual process for retrieving systems logs from various software systems. For example, technical support agents send requests for system logs to engineers (e.g., ECS engineers), an engineer generates the system log(s) on the subject software system(s), downloads the system log(s), uploads the system log(s) to a shared space (e.g., a Sharepoint site) that is accessible to both the engineers, who retrieved the system log(s), and the technical support agents, who requested the system log(s). For example, the technical support side can provision the shared space and grant access to the engineer side.

Accordingly, traditional approaches to ticket resolution are time- and resource-inefficient. For example, engineers have to follow a time- and resource-consuming, manual process to provide system logs to technical support agents. This not only results in inefficiencies, but also results in an extended period of time to resolve the issues represented in the tickets, increasing the disruption time to customers. Further, in order to share system logs, technical resources (e.g., processors, memory, bandwidth) are expended to generate and maintain shared spaces. In some instances, any changes to a ticket can result in a shared space being unavailable for the ticket, which requires another shared space to be requested and created, and the system logs again uploaded.

In view of the above context, implementations of the present disclosure provide a system log management system for centralized processing of system logs. In some implementations, the system log management system bridges multiple tools and components to collect system logs in response to tickets. This enables simpler and consistent automated collection system log to provide, among other services, precise and consistent root cause analysis (RCA) and resolution of issues represented in tickets. As described in further detail herein, the system log management system of the present disclosure provide time- and resource-efficient management of tickets to minimize the impact of issues on production use of software systems.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In some implementations, the server system 104 can host one or more software systems in a cloud environment, with which one or more customers (e.g., agents of customers) can interact in support of enterprise operations. In some implementations, the server system 104 can also host system log management system for centralized processing of system logs in accordance with implementations of the present disclosure. For example, a customer can raise a ticket in response to an issue that the customer is experiencing with a software system. In some examples, the ticket is raised and is made available to a vendor of the software system through service management tool (e.g., SPC).

More particularly, and as discussed in further detail herein, a technical support unit submits a log request form to a ticketing system (e.g., ServiceNow) that includes a system identifier (e.g., that uniquely identifies the software system experiencing the issue) and indicates one or more types of system logs (e.g., database logs, application logs) that are to be collected for resolution of the issue analysis. The log request form is transmitted to a management tool (e.g., SPC), which automatically executes actions in response to the log request form. For example, and in response to receiving the log request form, a service execution component of the management tool initiates a fully automated procedure that collects the logs for the software system, as indicated in the log request form, and uploads the logs to a central repository, which can be referred to as a document service. After the logs are uploaded, a uniform resource locator (URL) is generated, which provides a link to a web page, through which the logs can be accessed. A response is sent to the ticketing system, which includes the URL. A user (e.g., a technical support engineer) can click on the URL to download the log files for analysis.

Figure 2:
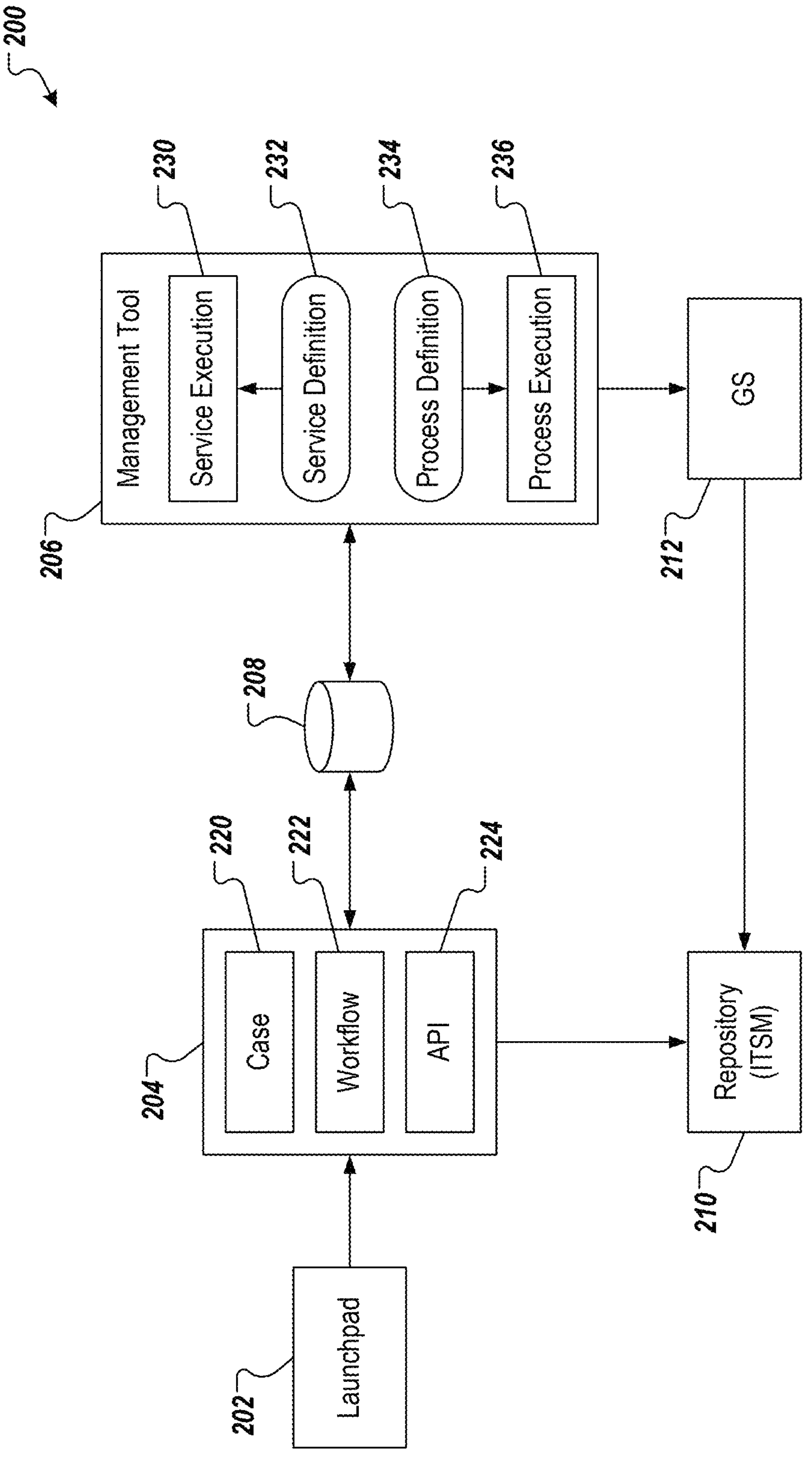
FIG. 2 depicts a conceptual architecture in accordance with implementations of the present disclosure.

FIG. 2 depicts an example conceptual architecture 200 in accordance with implementations of the present disclosure. In the depicted example, the example conceptual architecture 200 includes a launchpad 202, a ticketing system 204 (e.g., ServiceNow), a management tool 206 (e.g., SPC), a cloud platform integration (CPI) component 208, a repository 210 (e.g., an information technology service management (ITSM) document store), and a gateway server (GS) 212. The ticketing system 204 includes a case module 220, a workflow module 222, and an application programming interface (API) module 224. The management tool 206 includes a service execution module 230, a service definition 232, a process definition 234, and a process execution module 236.

In some examples, the GS 212 can be described as an infrastructure server that is tailored for each customer to manage essential infrastructure services (e.g., Squid proxy, DNS, LDAP, and the like). In the example of ECS, the GS 212 is provided as a Customer Gateway Server (CGS). All management network connections are routed through the GS 212. Therefore, whenever there is a need to access any servers within the environment of a customer, the connection is funnelled through the GS 212, ensuring secure and controlled access to the infrastructure services. This centralized approach helps streamline network management and reinforces security protocols across the customer network. In the context of the present disclosure, the GS 212 is used as a medium to transfer data between a private cloud environment to the repository 210 (e.g., hosted on the SAP Business Technology Platform (BTP)).

In some implementations, the launchpad 202 is a front-end system that enables users to interact with the ticketing system 204 through one or more user interfaces (UIs), examples of which are discussed in further detail herein. In some examples, the ticketing system 204 is configured to track resolution of issues arising in software systems. For example, a ticket can be generated (e.g., manually, automatically) in response to an issue with a software system (e.g., a bug that renders the software system partially or completely inoperable) and the ticketing system 204 enables tracking resolution of the issue represented in the ticket. In some examples, a ticket can be described as an electronic document that records data representative of the issue and resolution thereof. In some implementations, the management tool 206 is configured to enable users (e.g., engineers) to handle tickets working toward resolving the issue represented in the ticket.

In accordance with implementations of the present disclosure, the CPI component 208 integrates disparate systems within a cloud platform. In the example of FIG. 2, the CPI component 208 integrates the ticketing system 204 and the management tool 206 to enable the ticketing system 204 and the management tool 206 to interact with one another and automatically execute operations for collection of log files and enabling access to the log files, as described in detail herein.

In some implementations, an issue arising with a software system can result in a ticket being generated in the ticketing system 204. In some examples, the ticket is automatically generated in response to the issue. In some examples, the ticket is manually generated in response to the issue (e.g., a customer contacting technical support). In some examples, the issue is documented within the ticketing system 204 as a case by the case module 220, which assigns a case identifier (case ID) to the case, which uniquely identifies the case. To troubleshoot the problem, a user (e.g., a technical support engineer) opens a form in the ticketing system 204 (e.g. through a UI of the launchpad 202). For example, the workflow module 222 provides the form as part of execution of a log collection workflow. In some examples, the form enables the user to input information that can be used to collect log files that are relevant to resolving the issue.

Figure 3:
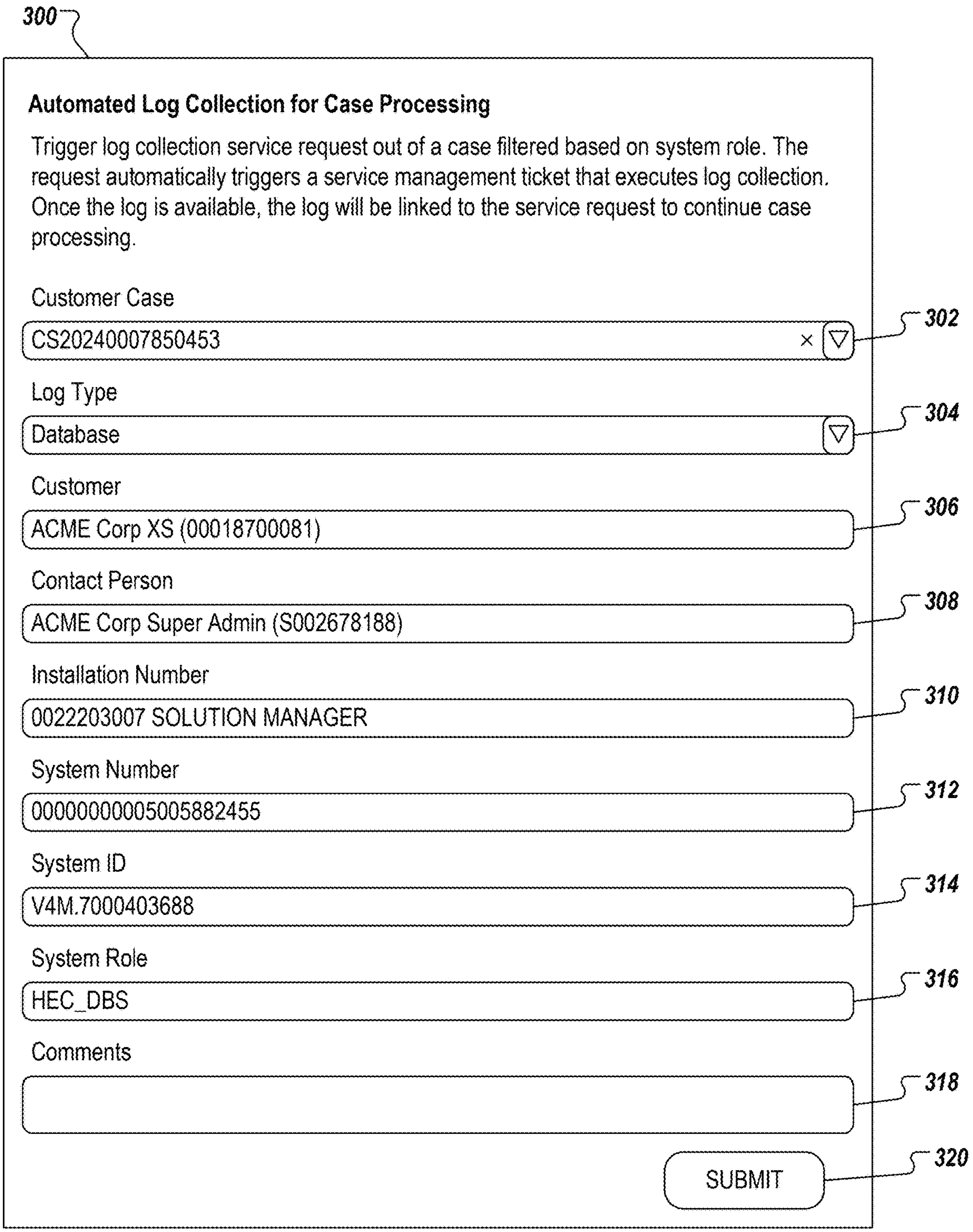
FIG. 3 depict an example user interface (UI) in accordance with implementations of the present disclosure.

FIG. 3 depicts an example UI in accordance with implementations of the present disclosure. The example UI is representative of a form 300 that a user can submit for collection of log files. In the example of FIG. 3, the UI 300 includes a case ID field 302, a log type field 304, a customer field 306, a contact person field 308, an installation number field 310, a system number field 312, a system identifier field 314, a system role field 316, and a comments field 318.

In some examples, the case ID field 302 provides a drop-down list of case IDs for pending tickets (e.g., representative of unresolved issues). The user can select a case ID and, in response, data representative of the case corresponding to the case ID can be automatically populated in other fields of the form 300. For example, information is automatically populated in the customer field 306, the contact person field 308, the installation number field 310, the system number field 312, the system identifier field 314, and the system role field 316. In some examples, the information is provided from the ticket that was generated in response to the issue. In some examples, the log type field 304 provides a drop-down list of log types that can be collected. Example log types include database logs and application logs. The user can optionally input comments to the comments field 318. Once satisfied with the information in the form 300, the user can submit the form 300 by clicking on a submit button 320.

In some implementations, in response to submission of the form, the ticketing system 204 transmits the form to the management tool 206. For example, the workflow module 222 can initiate transmission of the form through an API of the API module 224. For example, the form can be transferred to the management tool 206 as a payload through the CPI component 208. In some examples, the payload represents the actual content (e.g., the form) exchanged in a message and hides any differences in messaging protocols (e.g., extensible markup language (XML) messaging protocols). In some examples, a payload interface defines methods that enable access various aspects of the payload. In general, payloads are generic and can handle any type of data (e.g., binary data) and can be created as payload objects by factory methods in a message interface.

In response to receiving the payload, the management tool 206 unpacks the payload and automatically creates a service execution. For example, the service execution module 230 creates the service execution using the service definition 232. In some examples, the service definition 232 defines a configuration data representative of how the service execution should execute. Example configuration data can include a service definition name, a service definition identifier, an automated procedure description, a procedure identifier, and one or more input parameters. By way of non-limiting example, example configuration data can include:

Service Definition Name: Fulfilment—ECS Log Collection

Service Definition ID: ACE38957

Automated Procedure: ECS: LOGS COLLECT AND UPLOAD FOR PRODUCT SUPPORT

Procedure ID: ACE257151

Input Parameters: SYSTEM_NUMBER

In some examples, the service is automatically executed based on the configuration data defined in the service definition 232, which triggers the automated procedure defined in the configuration data (e.g., ECS: LOGS COLLECT AND UPLOAD FOR PRODUCT SUPPORT). For example, the process definition 234 is a collection of individual automated steps in a sequential manner that are combined to create an automated procedure (e.g., end-to-end log collection procedure), and the process execution module 236 uses the process definition 234 and executes it on the customer system (target system).

In some examples, and as described herein, the automated procedure is executed to collect the log files (e.g., database logs, application logs) for the software system identified in the payload (e.g., by system identifier, installation number, and/or system number). In some examples, the automated procedure can be described as can be described as an intelligent automation that can determine how to connect to the log system of the software system for retrieval of log files. For example, and in the case of application logs, the automated procedure can determine a type of application (e.g., ABAP, JAVA, BOBJ, Cloud Connector, Webdispacther) and, in the case of database logs, a type of databases (e.g., HANA, SYBASE, MSSQL Server).

In some examples, information, such as the application type and the database type, and other system attributes are determined based on unique identifiers assigned to each component. The system attributes are stored in a landscape director (e.g., a Cloud Landscape Directory (CLD) within the SPC) and records additional attributes (e.g., system role, database type, infrastructure type, database host, and the like).

In some implementations, the automated procedure triggers collection of the log files based on the application type and/or database type. In some examples, the log collection process varies depending on the particular system (e.g., HANA, ABAP, JAVA). For example, a "hostagent" connects to the customer system using a protocol (e.g., secure shell (SSH)). Examples are described in further detail herein to non-limiting example systems.

For example, for HANA the log collection process can include:

1. Log into target database host
2. switch to admin user: <sid>adm
3. Execute command: "cdpy"
4. Trigger full system dump "python fullSystemInfoDump.py -t <DBNAME> --days=7-nosql"
5. Where <DBNAME> is the database/tenant name to collect logs for (e.g. SYSTEMDB, ABC, . . . )
6. Extract the file path to the written log from the command output. For example: System information written to file/usr/sap/ABC/SYS/global/sapcontrol/snapshots/fullsysteminfodump_ABC_SYSTEMDB_hec01 v001234_2023_05_24_06_31_35.zip
7. Repeat step 3 and 4 for every database/tenant as required For ABAP, the log collection process can include:

1. Log into target application host
2. switch to admin user: <sid>adm
3. Navigate to below directories and collect the logs that are created in the last <n> minutes, Where n being duration of time in minutes
4. system profiles: all files under "DIR_PROFILE/usr/sap/<SID>/SYS/profile"
5. ASCS instance work folder: all files under "DIR_PROFILE/usr/sap/<SID>/<ASCS Instance>/work
6. DIA instance work folder: all files under/usr/sap/<SID>/<DIA Instance>/work
7. Create a Zip or tar file in/install directory For JAVA, the log collection process can include:

1. Log into target application host
2. switch to admin user: <sid>adm
3. Navigate to below directories and collect the logs that are created in the last <n> minutes, Where n being duration of time in minutes.
4. Work directory from each Java Instance: usr\sap\<SID>\<instnr>\work
5. Work directory from SCS Instance: usr\sap\<SID>\SCS<xx>\work
6. Provide all 20 defaultTrace files from each Java Server Node on each Instance: usr\sap\<SID>\<instnr>\j2ee\cluster\server<n>\log
7. profile directory: usr\sap\<SID>\SYS\profile
8. Config Tool folder: usr\sap\<SID>\<instnr>\j2ee\configtool
9. instance.properties file: usr\sap\<SID>\<instnr>\j2ee\cluster\instance.properties
10. Create a Zip or tar file in/install directory In accordance with implementations of the present disclosure, after the log files are collected, the log files are uploaded to the repository 210. In some examples, uploading of the log files to the repository 210 is performed through execution of a command. An example command can be provided as:

"curl -v -su <IV_DOCUMENTS_USER> -X POST -F file=@<FILE> --proxy proxy: 8080"

The command is executed on the target system, which refers to the database or application host identified and enriched from the landscape directory (e.g., CLD) based on the system identifier.

In some examples, the connection for uploading the log files is routed through the GS (e.g., the GS 212 of FIG. 2) that is exposed to a public network (the Internet). In some examples, the command is associated with authentication data that enables the command to be authenticated and the log files uploaded to the repository 210. In some examples, a log file is provided as an archive file, such as a .tar file.

In some examples, authentication to the target system (customer system) is managed through various mechanisms to ensure security. In context of the present disclosure, and in the example of SAP components, access to the operating system (OS) layer is established using a "sapadm" user. The credentials for accessing the system are stored in a tool called Cloud Access Manager (CAM), which enables access to be requested for a limited duration (e.g., 4 hours maximum). Once the requested time expires, a lock prevents unauthorized access. Table 1 provides details of example connections and authentication mechanisms:

TABLE 1

Example Connection Mechanisms and Authentication

| Source | Target | Protocol | Port | Encrypted | Auth. | User type | Comment |
|---|---|---|---|---|---|---|---|
| SPC | Document store repository | https | 443 | X | User | DOCSHARE_API | Connection routed through Squid proxy (3128) |
| SPC | ECS customer VM | https | 443 | X | User | Sapadm | Connection to Host agent using |
| Service now | SPC | https | 443 | X | certificate | End Point access | CPI system is used to authenticate communication |
| SPC | Service Now | https | 443 | X | certificate | End Point access | CPI system is used to authenticate communication |

In some implementations, after upload of the log files to the repository 210, a response is provided to the ticketing system 204. In some examples, the response includes a URL that provides a link to the log files within the repository 210. In some examples, the response includes a service execution identifier that uniquely identifies execution of the service. For example, the management tool 206 can generate the response and can communicate the response to the ticketing system 204 through the CPI component 208. In some examples, the ticketing system 204 can update the ticket that originated the request to collect the log files. For example, the ticket can be updated to include the URL. In this manner, the user (that submitted the form to initiate the collection process) can view the ticket and click on the URL to download the log files.

Figure 4:
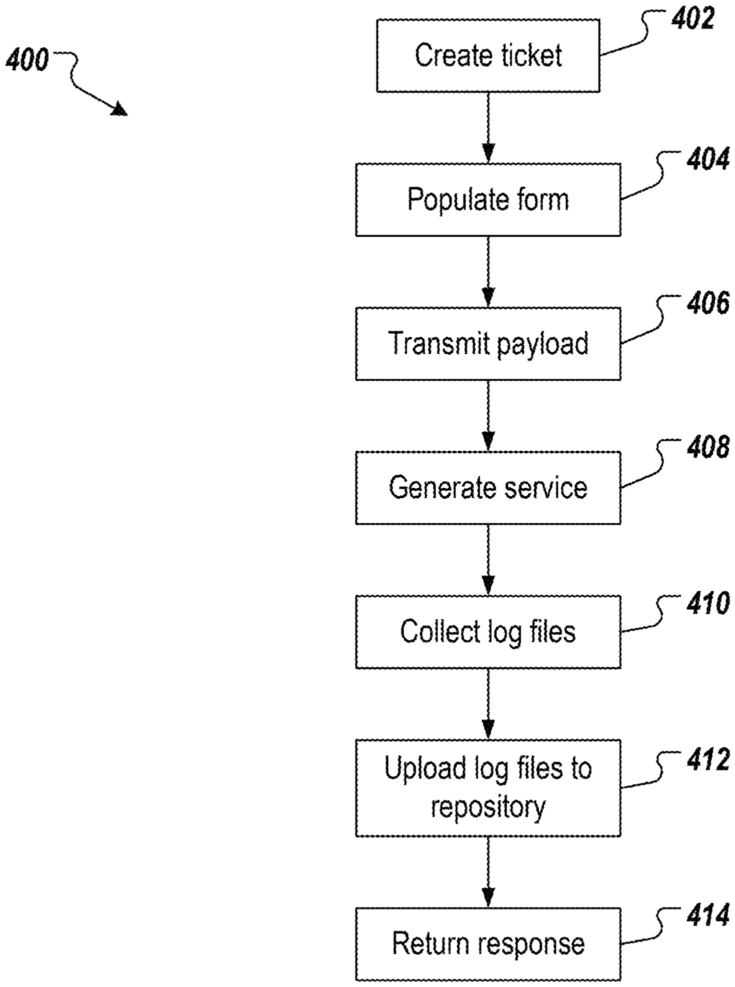
FIG. 4 depicts an example process that can be executed in accordance with implementations of the present disclosure.

FIG. 4 depicts an example process 400 that can be executed in accordance with implementations of the present disclosure. In some examples, the example process 400 is provided using one or more computer-executable programs executed by one or more computing devices.

A ticket is created (402). For example, and as described herein with reference to FIG. 2, an issue arising with a software system can result in a ticket being (automatically, manually) generated in the ticketing system 204. A form is populated (404). For example, and as described herein, a user (e.g., a technical support engineer) opens a form in the ticketing system 204, the form enabling the user to input information that can be used to collect log files that are relevant to resolving the issue. In some examples, the form records a first sub-set of data that is automatically populated in the form and records a second sub-set of data that is input by the user. A payload is transmitted (406). For example, and as described herein, the ticketing system 204 can initiate transmission of the form through an API, the form being transmitted to the management tool 206 as a payload through the CPI component 208.

A service is generated (408). For example, and as described herein, in response to receiving the payload, the management tool 206 unpacks the payload and automatically creates a service execution using the service definition 232 and information contained in the payload. Log files are collected (410) and the log files are uploaded to a repository (412). For example, and as described herein, the service is automatically executed based on the configuration data defined in the service definition 232, which triggers the automated procedure defined in the configuration data (e.g., ECS: LOGS COLLECT AND UPLOAD FOR PRODUCT SUPPORT). In some examples, and as described herein, the automated procedure is executed to collect the log files and upload the log files to the repository 210. A response is returned (414). For example, and as described herein, a response is provided to the ticketing system 204 and includes a URL that provides a link to the log files within the repository 210. In some examples, the ticketing system 204 can update the ticket that originated the request to collect the log files. For example, the ticket can be updated to include the URL.

Implementations of the present disclosure achieve multiple advantages over traditional approaches to collection of log files for issue resolution. For example, traditional approaches are time- and resource-inefficient requiring actions to be largely manually executed. As such traditional approaches are not only error prone (requiring further time and technical resources to identify and correct), but also introduce delay in resolving issues in software systems. Such delay, however, extends downtime of software systems and disruption to operations of customers. Implementations of the present disclosure overcome these issues through the end-to-end, automated process for collection of log files, as described herein.

Figure 5:
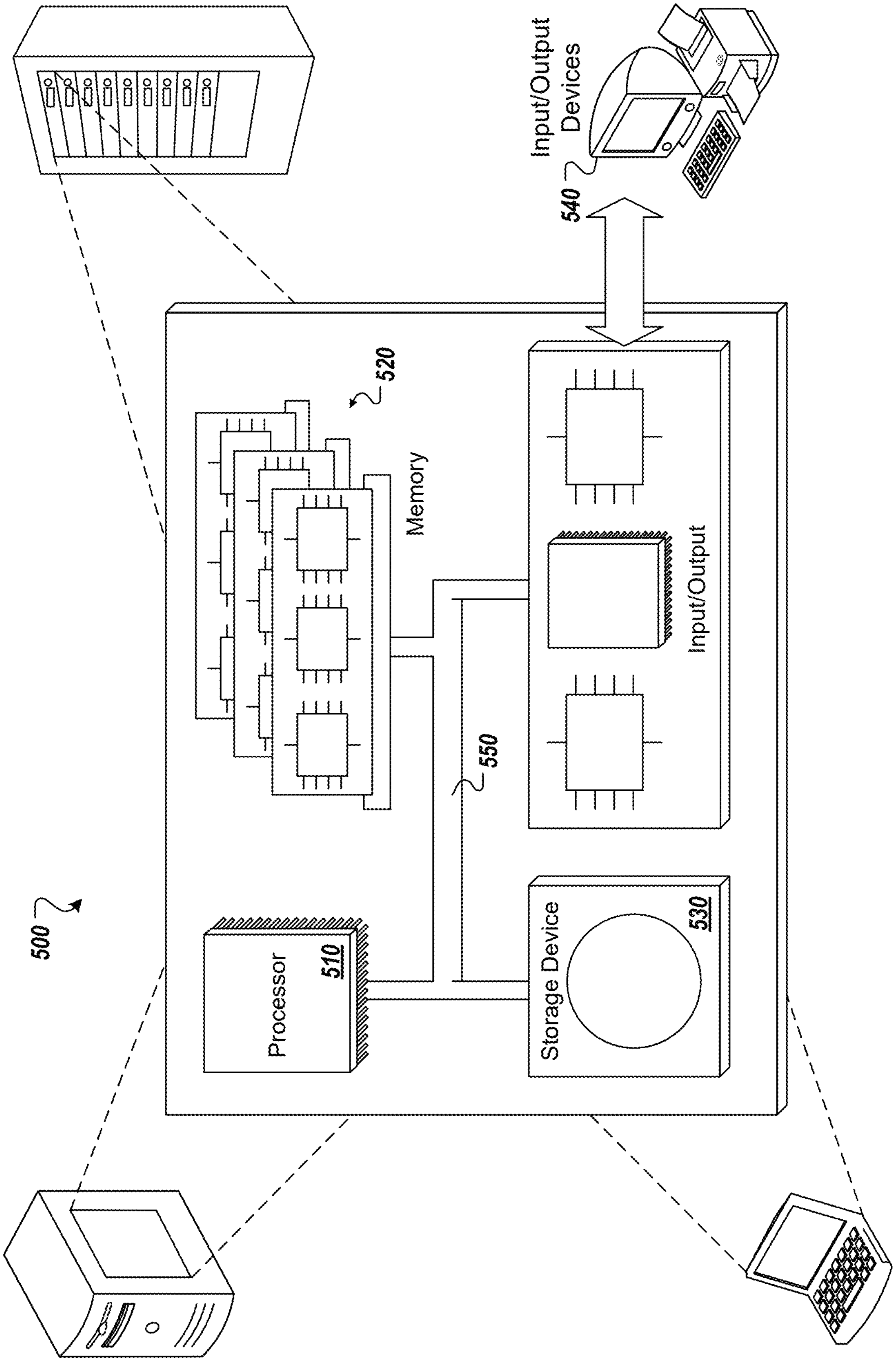
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for centralized log processing for resolution of issues arising in software systems, the method being executed by one or more processors and comprising:

receiving, by a management tool of a software vendor, a payload comprising system data that is representative of a software system experiencing an issue, the payload being transmitted from a ticketing system to the management tool through a cloud platform integration component to enable the ticketing system and the management tool to interact with one another and automatically execute operations for collection of log files;

generating, by the management tool, a service using the system data provided in the payload;

executing the service to trigger an automated procedure that:

collects one or more log files from one or more source systems, uploads the one or more log files to a repository through a gateway server, and provides a uniform resource locator (URL) that provides a link to the one or more log files within the repository; and transmitting a response to the ticketing system, the response comprising the URL to enable the ticketing system to access the one or more log files in the repository.

2. The method of claim 1, wherein the service is generated using a service definition that defines configuration data for the service.

3. The method of claim 1, wherein the cloud platform integration component provides a communication channel between the ticketing system and the management tool, the ticketing system being provisioned by a third-party provider.

4. The method of claim 1, wherein the system data comprises a first sub-set of data that is automatically populated in a form and a second sub-set of data that is input by a user that submits the form, the payload being generated using the form.

5. The method of claim 1, wherein the ticketing system updates a ticket to indicate that the one or more log files have been collected and to add the URL to the ticket.

6. The method of claim 1, wherein the one or more log files are identified for collection at least partially based on a system identifier and a type of system log provided in the system data.

7. The method of claim 1, wherein the response further comprises a service execution identifier that uniquely identifies execution of the service.

8. A non-transitory computer-readable storage medium coupled to one or more processors and having instructions stored thereon which, when executed by the one or more processors, cause the one or more processors to perform operations for centralized log processing for resolution of issues arising in software systems, the operations comprising:

receiving, by a management tool of a software vendor, a payload comprising system data that is representative of a software system experiencing an issue, the payload being transmitted from a ticketing system to the management tool through a cloud platform integration component to enable the ticketing system and the management tool to interact with one another and automatically execute operations for collection of log files;

generating, by the management tool, a service using the system data provided in the payload;

executing the service to trigger an automated procedure that:

collects one or more log files from one or more source systems, uploads the one or more log files to a repository through a gateway server, and provides a uniform resource locator (URL) that provides a link to the one or more log files within the repository; and transmitting a response to the ticketing system, the response comprising the URL to enable the ticketing system to access the one or more log files in the repository.

9. The non-transitory computer-readable storage medium of claim 8, wherein the service is generated using a service definition that defines configuration data for the service.

10. The non-transitory computer-readable storage medium of claim 8, wherein the cloud platform integration component provides a communication channel between the ticketing system and the management tool, the ticketing system being provisioned by a third-party provider.

11. The non-transitory computer-readable storage medium of claim 8, wherein the system data comprises a first sub-set of data that is automatically populated in a form and a second sub-set of data that is input by a user that submits the form, the payload being generated using the form.

12. The non-transitory computer-readable storage medium of claim 8, wherein the ticketing system updates a ticket to indicate that the one or more log files have been collected and to add the URL to the ticket.

13. The non-transitory computer-readable storage medium of claim 8, wherein the one or more log files are identified for collection at least partially based on a system identifier and a type of system log provided in the system data.

14. The non-transitory computer-readable storage medium of claim 8, wherein the response further comprises a service execution identifier that uniquely identifies execution of the service.

15. A system, comprising:

a computing device; and a computer-readable storage device coupled to the computing device and having instructions stored thereon which, when executed by the computing device, cause the computing device to perform operations for centralized log processing for resolution of issues arising in software systems, the operations comprising:

receiving, by a management tool of a software vendor, a payload comprising system data that is representative of a software system experiencing an issue, the payload being transmitted from a ticketing system to the management tool through a cloud platform integration component to enable the ticketing system and the management tool to interact with one another and automatically execute operations for collection of log files;

generating, by the management tool, a service using the system data provided in the payload;

executing the service to trigger an automated procedure that:

collects one or more log files from one or more source systems, uploads the one or more log files to a repository through a gateway server, and provides a uniform resource locator (URL) that provides a link to the one or more log files within the repository; and transmitting a response to the ticketing system, the response comprising the URL to enable the ticketing system to access the one or more log files in the repository.

16. The system of claim 15, wherein the service is generated using a service definition that defines configuration data for the service.

17. The system of claim 15, wherein the cloud platform integration component provides a communication channel between the ticketing system and the management tool, the ticketing system being provisioned by a third-party provider.

18. The system of claim 15, wherein the system data comprises a first sub-set of data that is automatically populated in a form and a second sub-set of data that is input by a user that submits the form, the payload being generated using the form.

19. The system of claim 15, wherein the ticketing system updates a ticket to indicate that the one or more log files have been collected and to add the URL to the ticket.

20. The system of claim 15, wherein the one or more log files are identified for collection at least partially based on a system identifier and a type of system log provided in the system data.

* * * * *